April 28, 1931.  P. H. CHASE  1,803,279
CABLE
Filed Dec. 3, 1928    2 Sheets-Sheet 1
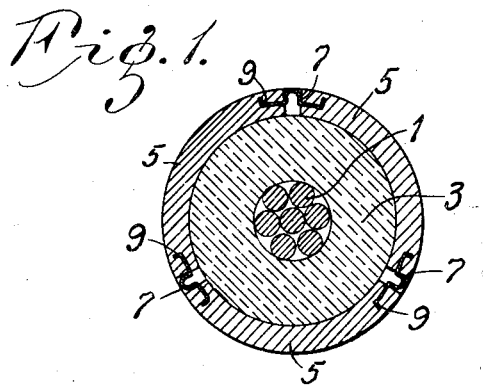
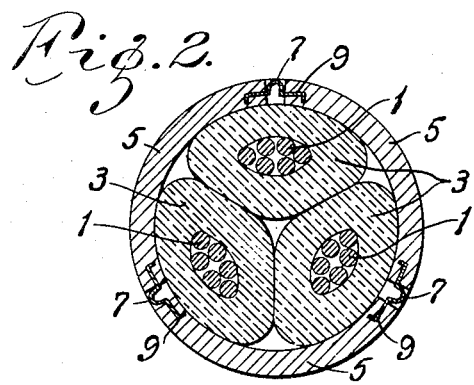
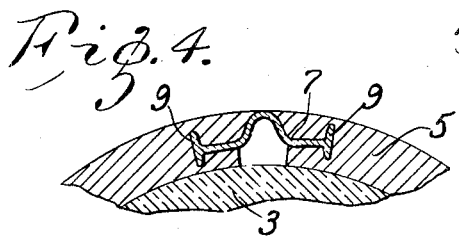
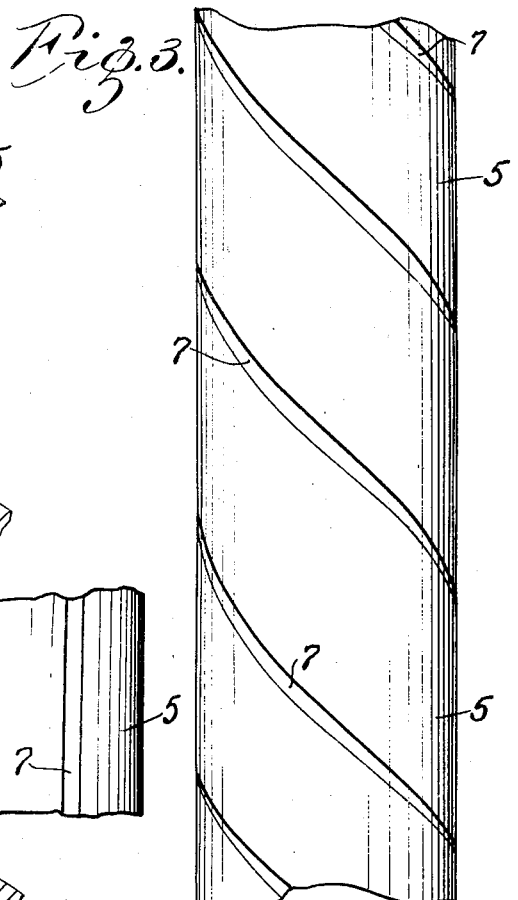
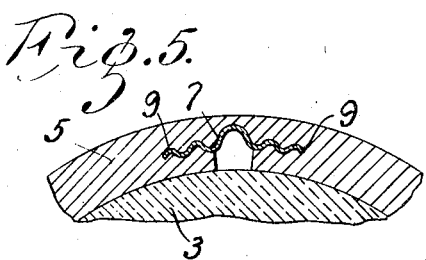
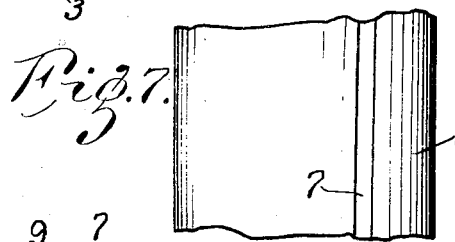
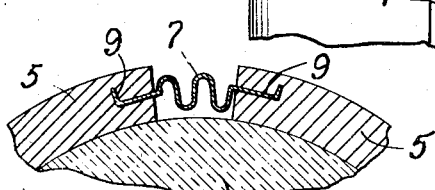
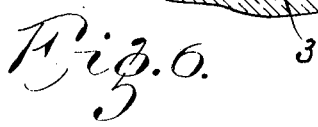

April 28, 1931. P. H. CHASE 1,803,279
CABLE
Filed Dec. 3, 1928   2 Sheets-Sheet 2

Philip H. Chase,
Inventor.
Delos T. Haynes
Attorney

Patented Apr. 28, 1931

1,803,279

UNITED STATES PATENT OFFICE

PHILIP H. CHASE, OF BALA-CYNWYD, PENNSYLVANIA

CABLE

Application filed December 3, 1928. Serial No. 323,520.

This invention relates to cables and with regard to certain more specific features to impregnated electric cable preferably for high voltages.

Among the several objects of the invention may be noted the provision of a simple and improved method of constructing a cable to relieve or equalize hydrostatic pressures within the sheath; the provision of a cable construction of the class described which minimizes the formation of voids therein; the provision of a cable construction of the class described which will be flexible and at the same time expansible; and the provision of a cable construction which will be resilient and yielding to the effects of volume change without permanent deformation. Other objects will be in part obvious and in part pointed out hereinafter.

The invention accordingly comprises the elements and combinations of elements, features of construction and operation, arrangements of parts, steps and sequence of steps which are exemplified in the structure hereinafter described and the scope or application of which is indicated in the following claims.

In the accompanying drawings in which are illustrated several embodiments of the invention, Figs. 1 and 2 are cross-sectional views of various forms of cables to which the invention may be applied;

Fig. 3 is a longitudinal view of a helical form of the invention;

Figs. 4, 5 and 6 are fragmentary cross-sectional views showing different forms of cleats;

Fig 7 is a longitudinal view similar to Fig. 1 illustrating an alternative, non-helical form of the invention;

Similar reference characters indicate corresponding parts throughout the several views of the drawings.

Figure 8:
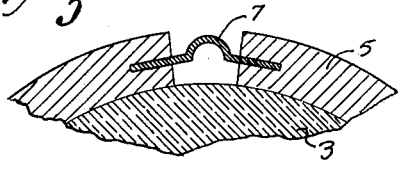
Figs. 8, 9, 10, 11 and 12 are fragmentary cross-sectional views similar to Figs. 4, 5 and 6, illustrating additional alternative forms of cleats.
Figure 9:
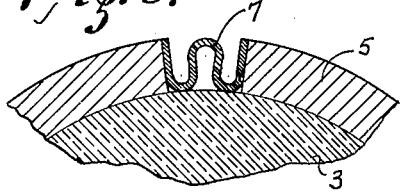
Figure 10:
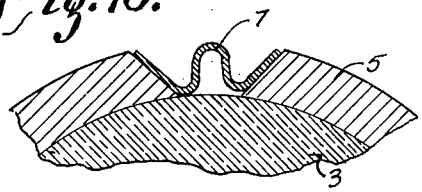
Figure 11:
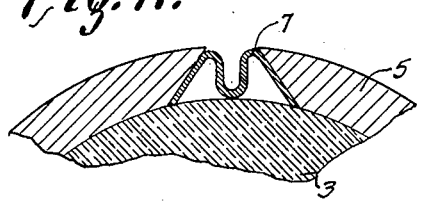
Figure 12:
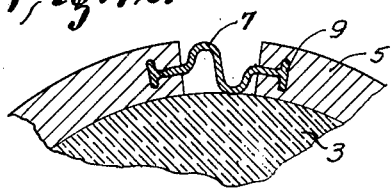

Referring now more particularly to Figs. 1 and 2, there is illustrated at numeral 1 the customary cable conductor or strand, surrounded by the insulation material indicated by numeral 3, the elements 1 and 3 comprising a core. In certain cases, illustrated by Fig. 1, there may be only a single conductor in the cable; while in other cases, illustrated by Fig. 2, there may be more than one conductor. Other types of cable may also be used, such as hollow conductor cable or the like.

Applied substantially longitudinally in parallel strips over the insulation compound is a series of lead strips 5 constituting part of a sheath. These strips or covering 5 may be applied in substantially parallel helical formation, as in Fig. 3, or they may be laid in straight longitudinal strips, as in Fig. 7. In a given cross section of the cable, there are generally sections of more than one strip. It should be understood, however, that such conformations are merely optional.

Laterally resilient expansion cleats 7 are placed between said strips 5 to allow for the contractive and expansive pressures set up in the cable. These cleats are made of some non-corroding resilient metal, such as, for example, copper, monel metal, tin-copper alloy or rust-resisting steel and are soldered or otherwise affixed to, and/or buried or imbedded in, the lead strip on each side thereof. The cleat forms a joint between adjacent lead strips and permit peripheral expansion movement. These expansion cleats may be made in different conformations, as illustrated in Figs. 4, 5, 6 and 8 to 15. In general, the cleat should have a conformation which permits it to extend laterally without stretching the metal itself and then resiliently return to its original position, only bending strains having been set up. A reentrant bellows shape, as in Fig. 6, or a simple arcuate shape, as in Figs. 4 and 5 will accomplish the result. Figs. 8 to 15 illustrate various other forms of cleats that may be advantageously used. Some of these forms are more adaptable to ready soldering under restricted conditions (such as, for example, in hidden away portions, or on reentrant curves) than the others, each form being particularly adaptable under particular conditions.

Figure 13:
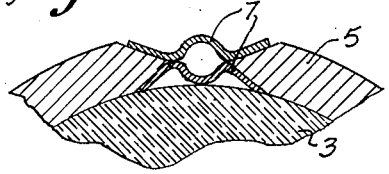
Figs. 13 and 14 are fragmentary cross-sectional views similar to Figs. 8 to 12 illustrating the alternative use of the cleats in pairs.
Figure 14:
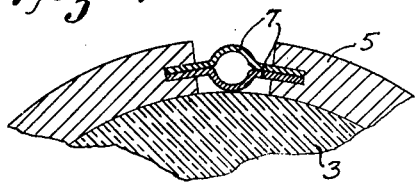

Figs. 13 and 14 illustrate the use of two of the cleats 7 in juxtaposition. With the double conformation here illustrated, one of the cleats may fail and the efficiency of the device will not be seriously impaired.

Figure 15:
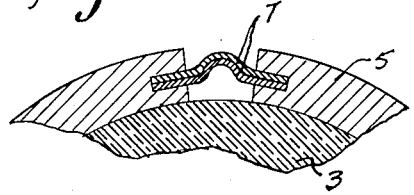
Fig. 15 is a fragmentary cross-sectional view similar to Figs. 13 and 14 illustrating the alternative use of a laminated cleat.

Fig. 15 illustrates a laminated cleat, in which the multiplicity of laminations acts to protect the cable as a whole, in the event of the failure of a single lamination. In this event the action is similar to that of the double cleats illustrated in Figs. 13 and 14.

It is to be understood that, while in Figs. 13, 14 and 15 two cleats are shown in juxtaposition or lamination, any number of cleats may be used without departing from the scope of this invention.

The principle here involved is that the cleat is resiliently expansible to an enlarged dimension while the lead strips are not. Variations of hydrostatic pressure within a cable are largely determined by the relative temperatures and coefficients of expansion of the conductor, insulation, compound and outer sheath. As the conductor, solid insulation and impregnating compound or oil are substantially incompressible, the resultant pressure from their expansion ordinarily is exerted on the outer sheath. In case this is of lead, permanent stretching of the sheath may be caused. Conversely, when the cable cools the internal hydrostatic pressure will be lower than under corresponding conditions before the sheath had stretched. Low pressures may result in the rapid deterioration and ultimate failures of the insulation, due to the formation of voids and ionization therein under electric stress. My cleat at once takes up the work of expanding the outer sheath and controls or regulates the hydrostatic pressure without stretching of the lead strips with consequent permanent deformation thereof and subsequently, upon the release of the pressure, allows the sheath to quickly return to its original volume without permanent deformation thereof.

The preferred form of the invention (preferred in certain respects herein to be described) is illustrated in Fig. 6, wherein the adjoining lead strips, held together by the cleat 7, are entirely separate, insofar as a lead to lead contact is concerned. In this case, danger of internal and external buckling of the lead is eliminated. The cleat 7 is so fastened to and/or embedded into the lead strips 5 that the interior of the cable is air and water tight. This is true of all conformations of cleats herein set out.

An alternative continuous form of lead covering is shown in Fig. 5, where the lead covers over the cleat and presents a smooth exterior.

A variation of the preceding conformation is shown in Fig. 4, wherein the cleat forms a portion of the surface of the sheath.

The substantially parallel longitudinal lead strips 5 may be laid in a helical manner, as in Fig. 3, or they may be laid in straight longitudinal strips, as in Fig. 7, as hereinbefore set out. The helical form is preferred, as it eliminates many of the stresses at bends and flexures of the cable that would be set up in any other type having parallel longitudinal strips. Although three lead strips are shown, it is to be understood that this invention includes other numbers of strips and/or materials. The sheath cover may comprise one or more strips, as desired. It is to be further understood that the forms of cleats shown in Figs. 1, 2, 4 to 6, and 8 to 15 may be used in connection with either of the constructions shown in Figs. 3 and 7.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A cable sheath comprising non-resilient sections formed around a cable core and laterally resilient expansion cleats joining said sections.

2. A cable sheath comprising non-resilient sections formed around a cable core and laterally resilient expansion cleats joining said sections, the sections and cleats completely enclosing the interior of the cable.

3. A cable sheath comprising non-resilient sections formed around a cable core and resilient expansion cleats joining said sections, said cleats being at least partially buried in said sections, the sections and cleats completely enclosing the interior of the cable.

4. A cable sheath comprising sectional lead strips formed around a cable core and resilient expansion cleats joining said sections.

5. A cable sheath comprising sectional lead strips formed around a cable core and resilient metallic expansion cleats joining said sections.

6. A cable sheath comprising spaced non-resilient strips formed around a cable core, cleats located between and joining the strips for enclosing said core, said cleats being formed so as to permit expansion and contraction of the sheath without said sheath being caused to take a permanent set.

7. A cable sheath comprising spaced lead strips formed around a cable core, cleats located between and joining the strips for enclosing said core, said cleats being buried at least partially in said lead strips and formed so as to permit expansion and contraction of the sheath without said sheath being caused to take a permanent set.

8. A cable sheath comprising lead strips formed around a cable core, cleats located between and joining the strips for enclosing the core, said cleats being formed with a curvature adapted to permit expansion and contraction of the sheath without the sheath taking a permanent set.

9. A cable sheath comprising substantially parallel non-resilient strips formed around a cable core, cleats located between the strips, said cleats being resilient so as to permit expansion and contraction of the sheath.

10. A cable sheath comprising substantially parallel lead strips formed about a cable core and resilient cleats joining said strips for permitting cable expansion without permanent setting.

11. A cable sheath comprising substantially parallel lead strips formed about a cable core and resilient cleats joining said strips for permitting cable expansion without permanent setting, said cleats being embedded in the lead.

12. A cable sheath comprising substantially parallel lead strips formed about a cable core and resilient cleats joining said strips for permitting cable expansion without permanent setting, said cleats being embedded in the lead and with the strips completely enclosing said core.

13. A cable sheath comprising substantially parallel lead strips formed about a cable core and resilient metallic cleats joining said strips for permitting cable expansion without permanent setting, said cleats having a curvature for making said expansion a maximum and being embedded in the lead.

14. A cable sheath comprising substantially parallel lead strips formed about a cable core and resilient metallic cleats joining said strips for permitting cable expansion without permanent setting, said cleats having a curvature for making said expansion, a maximum, said cleats being embedded in the lead and with the strips completely enclosing said core.

15. A cable sheath comprising lead arranged about a cable core and resilient cleats embedded therein for permitting cable expansion without permanent setting taking place.

16. A cable sheath comprising lead arranged about a cable core and helically arranged resilient cleats embedded therein for permitting cable expansion without permanent setting taking place.

17. A cable sheath comprising lead arranged about a cable core and resilient cleats embedded therein for permitting cable expansion without permanent setting taking place, said cleats being arranged parallel to the axis of the cable surrounded by the sheath.

18. A cable sheath comprising lead arranged about a cable core and at least one expansion joint arranged in said sheath, said joint having a component of expansion movement peripherally of the cable.

19. A cable sheath comprising a covering arranged about a cable core and at least one laterally resilient expansion cleat therein.

20. A cable sheath comprising a covering arranged about a cable core and at least one expansion joint arranged in said covering, said joint having a component of expansion movement peripherally of the cable.

21. A cable sheath comprising a covering continuously arranged about a cable core and at least one laterally resilient cleat therein.

22. A cable sheath comprising material arranged about a cable core and at least one resilient cleat connected therewith for permitting lateral cable expansion without permanent setting taking place.

In testimony whereof, I have signed my name to this specification this 26th day of November, 1928.

PHILIP H. CHASE.